United States Patent [19]

Saruta et al.

[11] Patent Number: 4,959,874
[45] Date of Patent: Sep. 25, 1990

[54] OPTICAL WIRELESS COMMUNICATION SYSTEM

[75] Inventors: Makoto Saruta, Hiratsuka; Tatsuhiro Suzuki, Yokohama, both of Japan

[73] Assignee: NCR Corporation, Dayton, Ohio

[21] Appl. No.: 269,823

[22] Filed: Nov. 9, 1988

[30] Foreign Application Priority Data

Dec. 28, 1987 [JP] Japan .................... 62-330401

[51] Int. Cl.$^5$ .................. H04B 10/14; H04J 14/02
[52] U.S. Cl. ................ 455/601; 370/3; 455/607
[58] Field of Search ........... 455/600, 606, 607, 617, 455/13, 601, 603; 370/1, 3, 4

[56] References Cited

U.S. PATENT DOCUMENTS

| | | | |
|---|---|---|---|
| 3,511,998 | 3/1966 | Smokler | 455/607 |
| 3,710,122 | 1/1973 | Burcher et al. | 370/3 |
| 3,810,255 | 5/1974 | Wacks et al. | 325/4 |
| 4,150,334 | 4/1979 | Williams | 325/3 |
| 4,207,521 | 6/1980 | Takada | 455/20 |
| 4,402,090 | 8/1983 | Gfeller | 455/601 |
| 4,664,518 | 5/1987 | Pfund | 455/608 |
| 4,709,411 | 11/1987 | Mori | 455/601 |

FOREIGN PATENT DOCUMENTS

| | | | |
|---|---|---|---|
| 0091271 | 10/1983 | European Pat. Off. | |
| 0189273 | 7/1986 | European Pat. Off. | |
| 0196347 | 10/1986 | European Pat. Off. | 370/4 |
| 0240119 | 10/1987 | European Pat. Off. | |
| 58-44832 | 6/1983 | Japan | |
| 0140941 | 7/1985 | Japan | 455/606 |
| 2187367 | 9/1987 | United Kingdom | |

OTHER PUBLICATIONS

Gfeller, "Wireless in Horse Data Communications Via Diffuse Infrared Radiation", Proceedings of IEEE, vol. 67#11, 11-87, pp. 1474-1486.

*Primary Examiner*—Joseph A. Orsino
*Assistant Examiner*—L. Van Beek
*Attorney, Agent, or Firm*—Wilbert Hawk, Jr.; Albert L. Sessler, Jr.; George J. Muckenthaler

[57] ABSTRACT

An optical wireless communications system includes a plurality of terminals each having a transmitter which transmits optical signals on a first carrier frequency and a receiver which receives optical signals on a second carrier frequency, and a plurality of optical repeaters each having a plurality of transmitters, a plurality of receivers and an optical signal destination determining structure, the optical repeaters being coupled to communicate with each other and with the terminals wherein each of the optical repeaters converts the carrier frequency of the received optical signals from one frequency to another frequency and transmits the latter frequency signals to all the terminals and to all the optical repeaters except the transmitting optical repeater of the latter frequency signals.

11 Claims, 5 Drawing Sheets

OPTICAL WIRELESS COMMUNICATION SYSTEM

BACKGROUND OF THE INVENTION

The present invention relates to an optical wireless communication system for data communication using light or like optic means wherein the data is transmitted among a plurality of units which are provided and placed in separate locations in a large room or in a plurality of rooms.

The optical wireless type communication is suitable for in-house communication wherein the units can be moved to other locations and the lay-out thereof can be readily varied in format. This type communication does not use any cable, optical fiber or like means to transmit data from one unit to another. In the matter of such optical wireless communication, light is radiated in the air for data communication, so that in case a plurality of units are provided and dispersed within a large room or in a plurality of rooms, optical signals may not reach all the units or may be cut off and it may be impossible to accomplish transmitting/receiving operations. Accordingly, in this type of communication system, there is employed an optical signal repeater which is provided in a relatively high position such as at the ceiling so as to receive optical signals transmitted from each of the units and to transmit the optical signals to other units. In this connection, it is to be noted that the plurality of units for data communication include office computers and terminals therefor, point of sale (POS) terminals and other various devices for in-house data communication. For the sake of convenience, these units will be called terminals in this specification.

As prior art of the optical wireless communication system, there has been proposed an invention disclosed in Japanese Patent Application No. 251925/83, which is a patent application submitted from Fujitsu Limited, under the names of Kenjiro Yano and others, entitled "Optical Wireless Communication System". In this prior art, an optical signal transmitted from any one of several terminals is temporarily sent to a control device by means of optical repeaters and is transmitted from the control device to all of the terminals by means of the optical repeaters. At the start of the sending data, the address of destination for the data is included, so that each terminal can receive the data after determining whether or not the data is to be transmitted and received by the specific terminal.

One drawback of the above-mentioned prior art is that the sending data is temporarily sent to the control device and is then transmitted to the terminal from such control device, so that the intercommunication among the terminals becomes impossible when the control device is defective or becomes inoperable.

Additionally, in the specification of the above-mentioned prior art, the description states that optical wireless communication means may be employed for data transmission between the optical repeaters and the control device. However, the use of such optical wireless communication means for data transmission between the optical repeaters and the control device presents a problem in that a signal sent from a repeater interferes with a signal sent from the control device between the repeater which transmits data to the control device and the control device which returns the data to the repeater. The interference between signals may sometimes result in an error in communication.

Additional documentation in the area of wireless communication includes U.S. Pat. No. 3,511,998, issued to M. I. Smokler on March 18, 1966, which discloses a method and means for initiating communication between two small-angle communication equipments capable of transmitting and receiving radiant energy at first and second frequencies.

U.S. Pat. No. 3,710,122, issued to E. E. Burcher et al. on January 9, 1973, discloses a laser remote control system that includes a transmitter with oscillators of different frequencies, a receiver that includes a light collector and a tuned circuit for each frequency, and an autotracker that includes a reflector at the receiver U.S. Pat. No. 3,810,255, issued to M. R. Wachs et al. on May 7, 1974, discloses a multi-spot beam transponder with means for connecting any band of any receive beam to any band of any transmit beam.

U.S. Pat. No. 4,150,334, issued to J. W. Williams on April 17, 1979, discloses a radio repeater control circuit that prevents voice signals from interfering with information signals when both signals are simultaneously repeated or transmitted together.

U.S. Pat. No. 4,207,521, issued to M. Takada on June 10, 1980, discloses a radio communication system comprising a transmitting station for transmitting output signals in a first common frequency, a repeater station for retransmitting the signals in a second common frequency, and a receiver station for receiving the retransmitted signals.

U.S. Pat. No. 4,402,090, issued to F. R. Gfeller et al. on August 30, 1983, discloses a communication system in which data are transmitted between terminal stations and satellite stations by infrared signals. All satellites are connected to the host by a common bus arrangement.

U.S. Pat. No. 4,664,518, issued to C. E. Pfund on May 12, 1987, discloses a secure communication system that uses narrow beam laser transmission between an orbiting satellite and another station.

And, U.S. Pat. No. 4,709,411, issued to K. Mori on November 24, 1987, discloses an optical communication system that includes a plurality of remote apparatuses which exchange optical signals with each other and wherein each apparatus includes a transmitter section and a receiver section disposed in a common housing.

SUMMARY OF THE INVENTION

The present invention relates to an optical wireless communication system for use with computers, terminals, or like equipment. More particularly, the present invention discloses a communication system for transmission of data by means of light beams or like optical technology, which includes infrared, visible, or ultraviolet radiation. The communication system is involved with and provides for transmission of data between units of equipment which are disposed in a large area or in multiple areas enabling such transmission in a line of sight path.

In accordance with the present invention, there is provided an optical wireless communication system comprising a plurality of terminals each having a transmitter which transmits optical signals with a first carrier frequency ($f_1$) and a receiver which receives optical signals with a second carrier frequency ($f_2$) through a first optical wireless communication channel, and a plurality of optical repeaters each of which has a plurality of transmitters, a plurality of receivers and means for determining destination of optical signals, the plurality of optical repeaters being connected so as to communicate optically with a group of said terminals by transmitting said optical signals through the first optical wireless communication channel and to communicate optically with each other by transmitting said optical signals through a second optical wireless communication channel, wherein each of said optical repeaters converts the carrier frequency of optical signals from said first frequency ($f_1$) to said second frequency ($f_2$) to transmit said optical signals converted to the second frequency ($f_2$) from said transmitter incorporated in each of said optical repeaters to all terminals and to all of the other optical repeaters connected thereto when each of said optical repeaters receives said optical signals ($f_1$) at said receiver therein from one terminal of said group of terminals through said first optical wireless communication channel, and each of said optical repeaters transmits optical signals ($f_2$) from said transmitter incorporated therein to all terminals and to all of the other optical repeaters connected thereto except the transmitting optical repeater of said optical signals ($f_2$) when said each of the optical repeaters receives at said receiver said optical signals ($f_2$) from the other optical repeater connected to said receiver through said second optical wireless communication channel.

In view of the above discussion, a principal object of the present invention is to provide an optical wireless communication system for transmitting data between computers, terminals, or like equipment.

Another object of the present invention is to provide an optical wireless communication system that includes optical repeaters for receiving and for transmitting data between the equipment.

An additional object of the present invention is to provide an optical wireless communication arrangement for transmitting signals at two frequencies to avoid interference between certain signals.

A further object of the present invention is to provide an optical wireless communication system wherein data is communicated among the optical repeaters to eliminate the use of a control device, as used in the above-mentioned prior art, thereby preventing the entire system from being disabled due to a defective or inoperable control device.

Still another object of the present invention is to provide an optical wireless communication system which includes optical repeaters in an arrangement wherein the occurrence of a communication error is avoided by constructing the arrangement such that one optical repeater does not transmit a signal which it receives to another optical repeater from which the signal is transmitted.

Additional advantages and features of the present invention will become apparent and fully understood from a reading of the following description taken together with the annexed drawing.

DESCRIPTION OF THE PREFERRED EMBODIMENT

Figure 1:
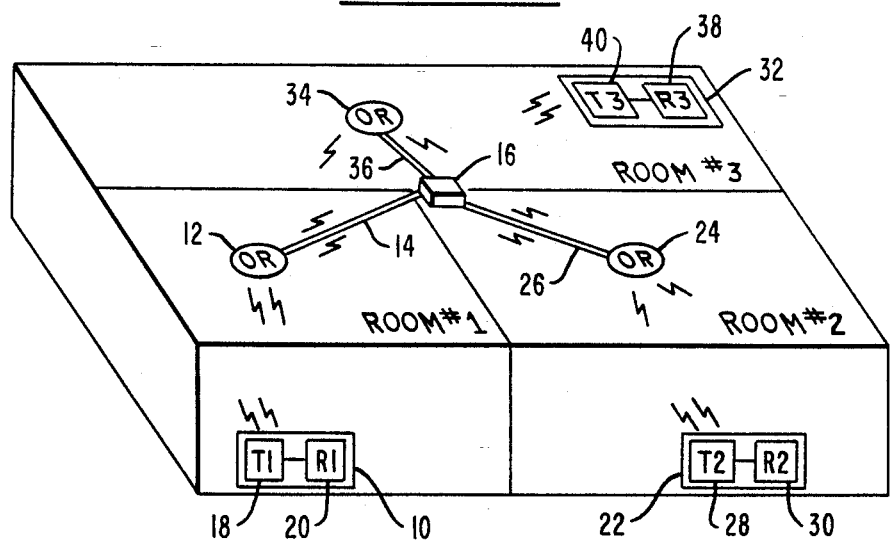
FIG. 1 shows a structure of a conventional optical wireless communication system in which a conventional control device is used in such system.

FIG. 1 shows a conventional optical wireless communication system wherein an optical signal that is transmitted from a terminal 10 in Room #1 is sent temporarily to an optical repeater 12 which may be located at the ceiling of the room. The optical signal from terminal 10 is transmitted from the optical repeater 12 along a path 14 to a control device 16 which is positioned at a location to be seen by the optical repeater 12. The terminal 10 includes an appropriate transmitter 18 and a receiver 20. An optical signal that is transmitted from a terminal 22 in Room #2 is sent to an optical repeater 24 located at the ceiling of the room and is transmitted from the repeater 24 along a path 26 to the control device 16. The terminal 22 includes an appropriate transmitter 28 and a receiver 30. Likewise, an optical signal that is transmitted from a terminal 32 in Room #3 is sent to an optical repeater 34 and is transmitted from the repeater 34 along a path 36 to the control device 16. The terminal 32 includes an appropriate transmitter 38 and a receiver 40. Of course, additional terminals and optical repeaters may be included in the several rooms. An optical signal that is transmitted from any one of the terminals 10, 22 or 32 is sent to the control device 16 and is then transmitted therefrom through the optical repeaters 12, 24 and 34 to all the terminals 10, 22 and 32. The address of the desired terminal 10, 22 or 32 is included at the start of the return signal from the control device 16 so that each terminal 10, 22 or 32 can determine whether or not the signal is to be received.

Figure 2:
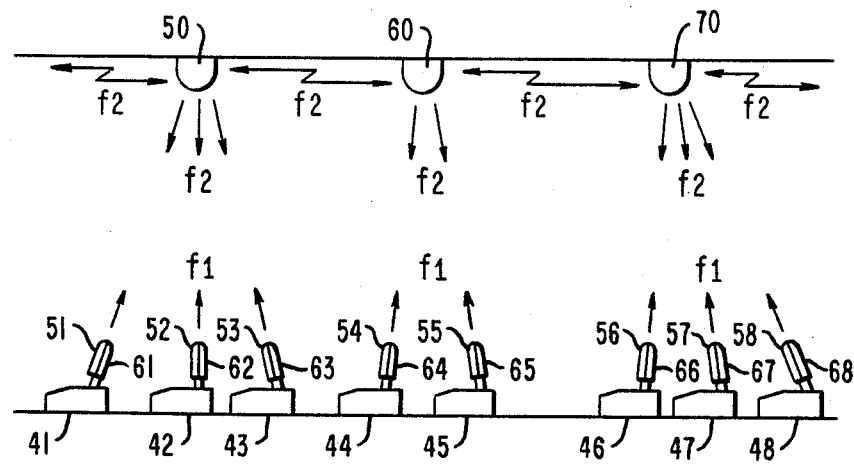
FIG. 2 shows the arrangement of the optical wireless communication system according to a preferred embodiment of the present invention.

A preferred embodiment of the present invention will be described with reference to the arrangement and structure illustrated in FIGS. 2 and 3. FIG. 2 shows the general arrangement of the optical wireless communication system according to the present invention. In the drawing, terminals 41, 42, 43, 44, 45, 46, 47, and 48 include transmitters 51, 52, 53, 54, 55, 56, 57 and 58 for transmitting optical signals at carrier frequency $f_1$ (hereinafter referred to as $f_1$) and receivers 61, 62, 63, 64, 65, 66, 67 and 68 for receiving optical signals at carrier frequency $f_2$ (hereinafter referred to as $f_2$). Optical repeaters 50, 60 or 70 are adapted to receive an optical signal $f_1$ from any of the terminals 41–48 or to receive an optical signal $f_2$ from any of the other repeaters to transmit the optical signals to the remaining repeaters or terminals other than the repeater or terminal from which the optical signal is received.

Figure 3:
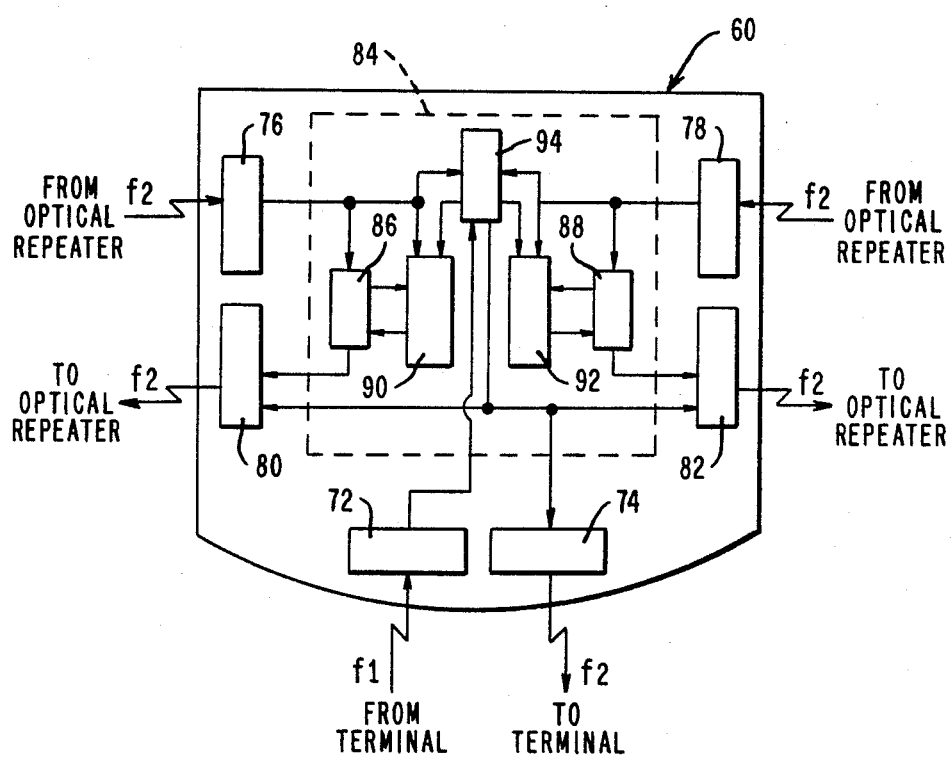
FIG. 3 shows the schematic structure of a repeater according to the embodiment of the present invention.

FIG. 3 shows the general structure of a repeater 50, 60 or 70. As an example, the repeater 60 consists of a receiver 72 for receiving the optical signal $f_1$ from the terminal 44, a transmitter 74 for transmitting the optical signal $f_2$ to the terminal 44, a pair of receivers 76 and 78 for receiving the optical signals $f_2$ from the other repeaters 50 and 70, and a pair of transmitters 80 and 82 for transmitting the optical signals $f_2$ to the other repeaters 50 and 70. The repeater 60 also includes means, within the dotted line and generally designated as 84, for determining destination of optical signals (hereinafter referred to as the determining means) and consisting of a pair of transmission forbidding signal generators 86 and 88, a pair of receive completion sensors 90 and 92, and a frequency converter 94.

In an explanation of the arrangement and structure illustrated in FIGS. 2 and 3, it is now assumed that data is transmitted from terminal 44 to terminal 48. Terminal 44 transmits an optical signal at the carrier frequency $f_1$ from the transmitter 54 of the terminal 44 to the optical repeater 60. It is understood that while the details of the optical repeater 60 are mentioned in this portion of the description of the invention, the various elements 72–94, inclusive, are equally applicable to optical repeaters 50 and 70. The repeater 60 receives the optical signal $f_1$ at the receiver 72 thereof which signal is sent from the terminal 44. The optical signal at the carrier frequency $f_1$ thus received from transmitter 54 is converted into an electric signal to be sent to the frequency converter 94, which converts the electric signal thus received into an electric signal at the carrier frequency $f_2$ to be output to the transmitters 74, 80 and 82. The transmitters 74, 80 and 82 convert the electric signals at the carrier frequency $f_2$ into optical signals at the carrier frequency $f_2$ to be transmitted to the terminals 44 and 45 and to the repeaters 50 and 70.

Although the transmitter 74 of the repeater 60 sends the optical signals to the terminals 44 and 45, the carrier frequency $f_1$ of the optical signal which is transmitted from the transmitter 54 of the terminal 44 is different from the carrier frequency $f_2$ of the optical signal transmitted from the repeater 60 to such terminals 44 and 45, so that the signal transmitted from the terminal 44 does not interfere with the signal transmitted from the repeater 60. Accordingly, the terminals 44 and 45 can correctly receive the signals at the carrier frequency $f_2$ transmitted from the repeater 60. However, it is to be noted that the data also is transmitted to the terminal 48, so that the terminals 44 and 45 simply confirm the address of destination in the received signals and will not receive the succeeding data. In this case, the system may be alternatively constructed such that only the terminal 44 which transmits the data to terminal 48 receives all the data from the repeater 60 and compares the data thus received with the data thus transmitted to see whether the data thus transmitted is correctly relayed via the repeater 60.

On the other hand, the optical signal at the frequency $f_2$ which is transmitted from the transmitter 82 of the repeater 60 to the repeater 70 is received by the receiver 76 of the repeater 70. The signal thus received by the receiver 76 is sent as an electrical signal to the frequency converter 94, to the transmission forbidding signal generator 86, and to the end of receive sensor 90. The transmission forbidding signal generator 86, upon receiving the electrical signal from the receiver 76, prepares a transmission forbidding signal to be output to the transmitter 80. The frequency converter 94 converts the electrical signal from the receiver 76 into the electrical signal at the frequency $f_2$ to be output to the transmitters 74, 80 and 82. The transmitter 82 converts the electrical signal at the frequency $f_2$ from the frequency converter 94 into an optical signal at the frequency $f_2$ to be transmitted to a repeater (not shown) located in a right-side position in FIG. 2. The transmitter 74 of the repeater 70 transmits the optical signal at the frequency $f_2$ to the terminals 46, 47 and 48. However, since the transmission forbidding signal has been output from the transmission forbidding signal generator 86 to the transmitter 80, the transmitter 80 does not transmit any optical signal. As has been described above, the transmitter 80 does not transmit any optical signal to the repeater 60, so that an error in communication due to the interference of optical signals will not occur in the optical wireless communication between the repeaters 60 and 70. The electrical signal received from the receiver 76 is also sent to the end of receive or receive completion sensor 90. When the level of an electrical signal that is output from the receiver 76 is low for a predetermined period of time, the receive completion sensor 90 considers that the transmission is completed and stops outputting the transmission forbidding signal from the transmission forbidding signal generator 86.

The terminals 46, 47 and 48, respectively, receive the optical signal from the transmitter 74 of the repeater 70. However, the terminals 46 and 47 do not find addresses of their own in the destination address in the received signals, so that the terminals 46 and 47 do not receive the succeeding data. The terminal 48 confirms that the data which is transmitted thereto from the destination address is contained in the received signal and thus such terminal 48 receives all the data.

The optical signal at the frequency $f_2$ which is transmitted from the transmitter 80 of the repeater 60 to the repeater 50 is received by the receiver 78 of the repeater 50. The repeater 50 transmits the optical signals at the frequency $f_2$ from transmitter 74 to terminals 41, 42 and 43 and from transmitter 80 to a repeater (not shown) located in a left-side position in FIG. 2. However, it does not transmit the optical signal $f_2$ from its transmitter 82 which is adapted to transmit a signal to the repeater 60. Although the terminals 41, 42 and 43, respectively, receive the optical signals $f_2$ from the transmitter 74 of the repeater 50, these terminals 41, 42 and 43 do not find their own addresses in the received signals, so that these terminals do not receive the succeeding data.

Figure 4A:
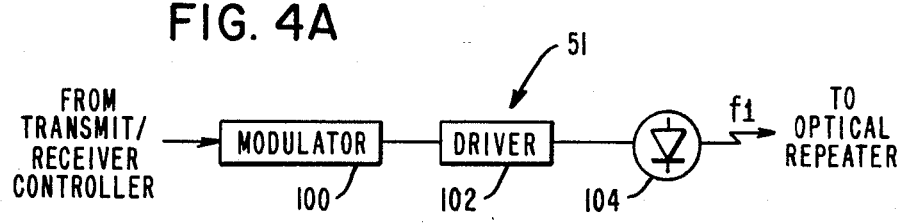
FIGS. 4A and 4B are block diagrams of a transmitter and a receiver of a terminal or like equipment.
Figure 4B:
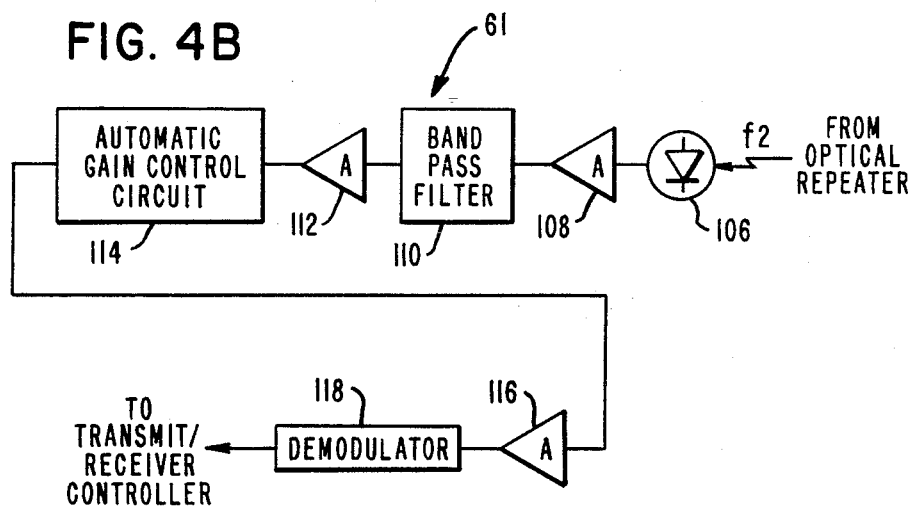
Figure 6:
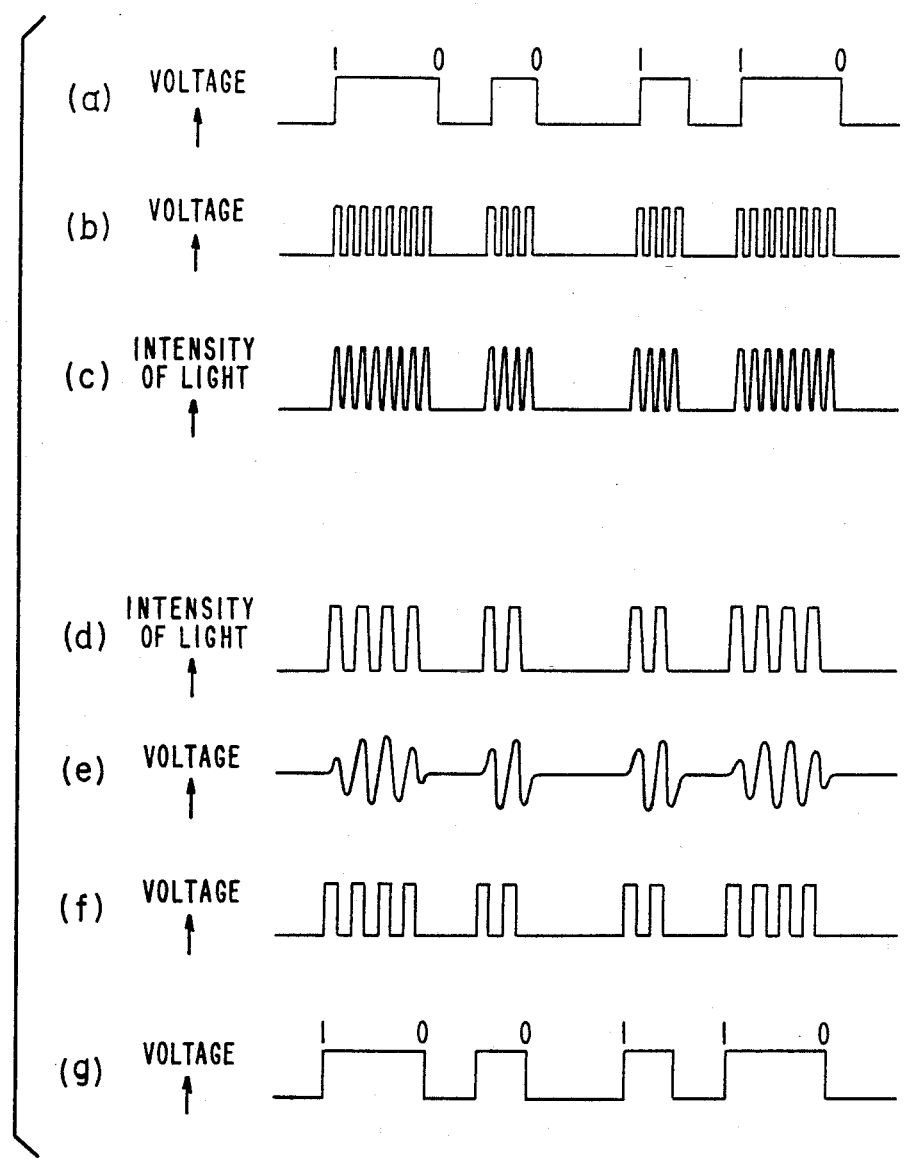
FIG. 6 shows waveforms of transmit and receive signals.

Next, a preferred embodiment of the present invention will be described in more detail with reference to the accompanying drawing. FIGS. 4A and 4B show schematic structures of the transmitter 51 and the receiver 61 of the terminal 41 (FIG. 2). The description for terminal 41 along with the transmitter 51 and the receiver 61 thereof applies equally for the other terminals 42–48, the other transmitters 52–58 and the other receivers 62–68 (FIG. 2). The terminal 41 includes the transmitter 51 for transmitting the optical signal at the frequency $f_1$, the receiver 61 for receiving the optical signal at the frequency $f_2$ from the repeater 50, and a transmit/receive controller (not shown). In this connection, data transmit/receive control by a transmit/receive controller is well known in the art, so that the description thereof is not included herein. FIG. 6 shows wave forms of signals at respective individual portions or areas of the terminal 41 and the optical repeater 50.

The transmitter 51 will be described in more detail with reference to FIGS. 4A and 6. The transmitter 51 includes a modulator 100, a driver 102 and a light emitting element 104. In a signal transmitting operation, coded data in the shape of a square wave form (FIG. 6($a$)) which is output from a transmit/receive controller (not shown) is modulated by the modulator 100 into a signal at the frequency $f_1$, as shown as a voltage wave form in FIG. 6($b$). The signal thus modulated is transmitted to the repeater 50 as an optical signal $f_1$, shown as an intensity of light wave form in FIG. 6($c$), from the light emitting element 104 which is driven by the driver 102.

Next, the receiver 61 of the terminal 41 will be described in more detail with reference to FIGS. 4B and 6. The receiver 61 includes a light receiver or light receiving element 106, a first amplifier 108, a band pass filter 110 for selecting signals at the frequency $f_2$, a second amplifier 112, an attenuator or automatic gain control circuit 114, a third amplifier 116 and a demodulator 118. The receiver 106 receives an optical signal $f_2$ which is transmitted from the repeater 50 as an intensity of light wave form shown in FIG. 6 (d). In order to avoid the interference between the transmitted optical signals, optical signals at different frequencies $f_1$ and $f_2$ are employed, and it is preferable that these frequencies are greatly different from each other. Accordingly, in this embodiment, it is preferred that $f_1 = 1.536$ MHz and $f_2 = 768$ KHz. The light receiver 106 converts the received optical signal $f_2$ into an electrical signal that is to be output to the first amplifier 108 which amplifies the electrical signal thus input to the first amplifier and to be output therefrom to the band pass filter 110. The band pass filter 110 selects only signals at the frequency $f_2$ and outputs an electrical signal, as shown as a voltage wave form in FIG. 6(e), to the second amplifier 112. The electrical signal which is amplified by the second amplifier 112 is output therefrom to the third amplifier 116 through the attenuator or automatic gain control circuit 114 in order to reduce distortion in the wave form. The electrical signal which is output from the attenuator or automatic gain control circuit 114 is amplified by the third amplifier 116 into a required magnitude and is output from the third amplifier to the demodulator 118 which codes the electrical signal received from the third amplifier 116 into a signal, shown as a voltage wave form in FIG. 6(g), to be output to a transmit/receive controller (not shown) in the terminal 41 (FIG. 2). The signal transmitting/receiving operation is performed among the various terminals 41–48, inclusive, in the above mentioned manner.

Figure 5A:
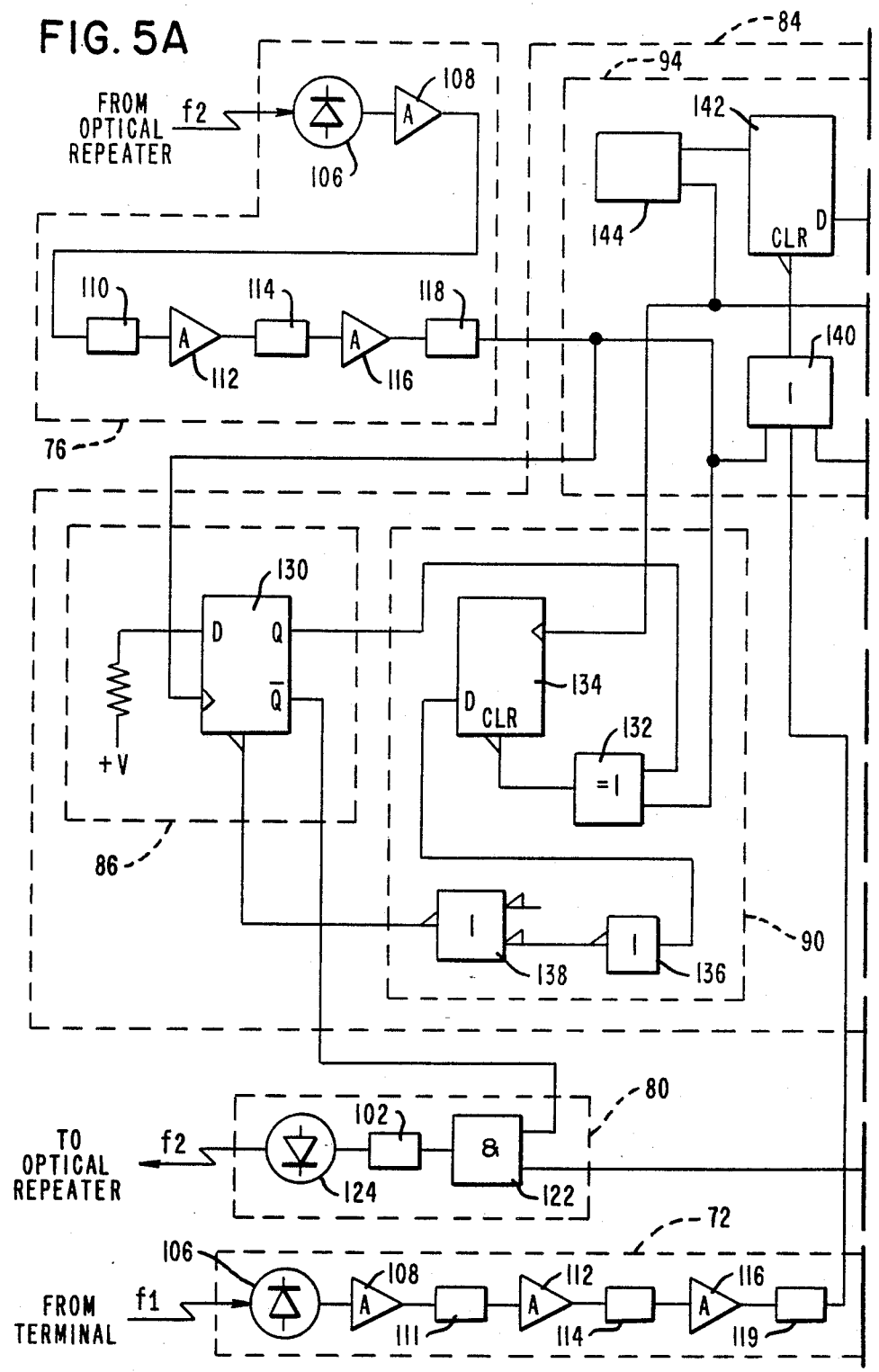
FIGS. 5A and 5B the structure of the repeater shown in FIG. 2 and including the details of the destination determining means.
Figure 5B:
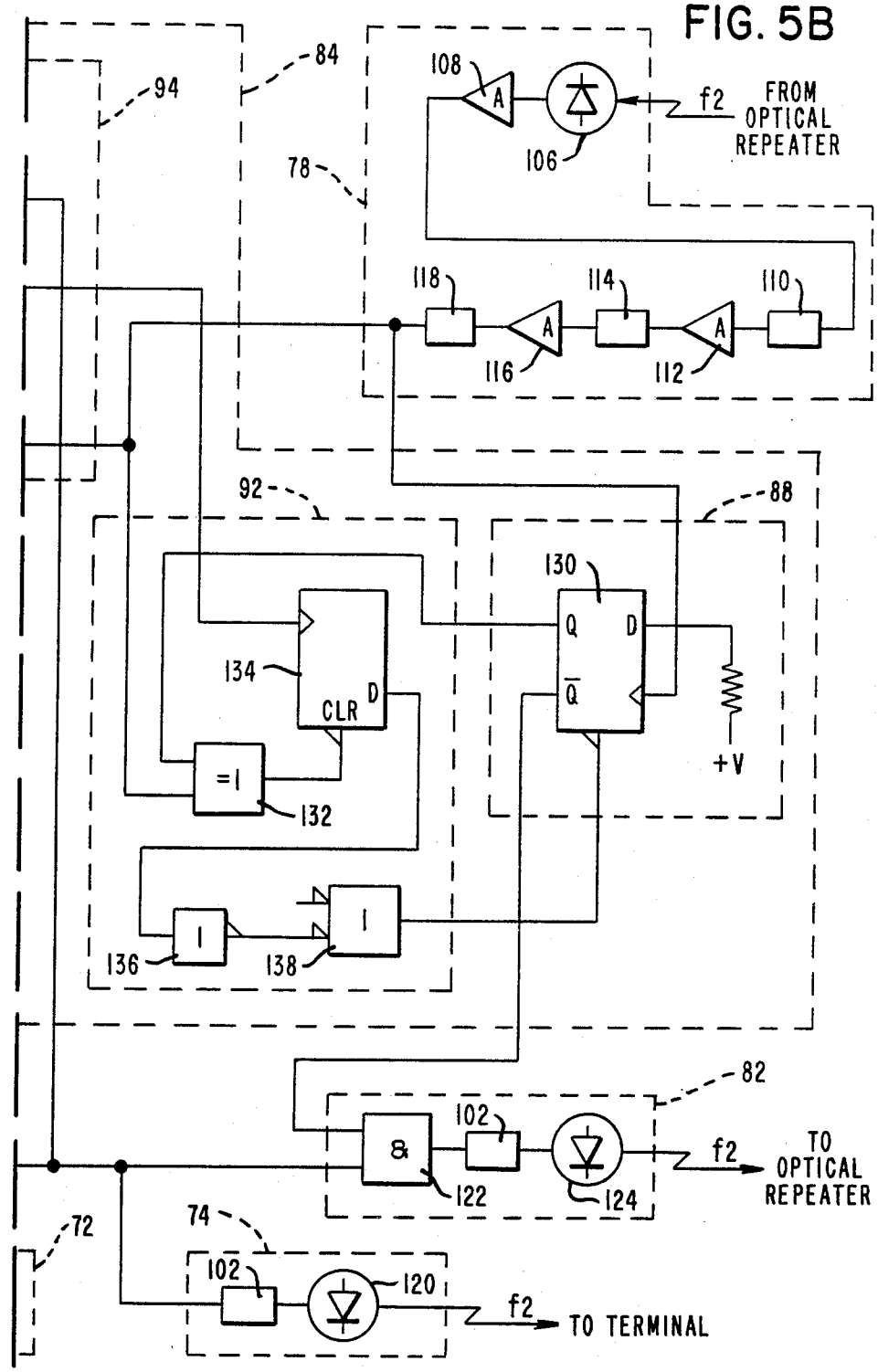

Next, the structure of the optical repeater 60 and the individual operations associated with receipt of the optical signal, the frequency conversion of received signals, the designation of signal destination, and optical signal transmission will be described in more detail with reference to FIGS. 5A and 5B. It should be noted that in the portions surrounded by broken lines, like numerals denote like parts, as indicated at 84 in FIG. 3.

The optical repeater 60 includes the receiver 72 (FIG. 5A) for receiving the optical signal $f_1$ from the terminal 44, the receivers 76 and 78 (FIG. 5B) for receiving optical signals $f_2$ from the other repeaters 50 and 70 and the transmitter 74 (FIG. 5B) for transmitting an optical signal $f_2$ which is wide in band and direction to the terminal 44. The optical repeater 60 also includes the transmitters 80 and 82 for transmitting optical signals $f_2$ which are relatively narrow in band and direction to the other repeaters 50 and 70, and the repeater 60 also includes the destination determining means 84. The receiver 72 is constructed in almost the same manner as the receiver 61 (FIG. 4B) of the terminal 41 or the receiver 64 of the terminal 44 (FIG. 2), except that a band pass filter 111 and a demodulator 119 (FIG. 5A), which are somewhat different from those used in the terminals 41 or 44, are applied in the circuit because the frequency of light received at receiver 72 is different from that of the light received by receiver 51 of terminal 41 or of the light received by receiver 64 of terminal 44. The receivers 76 and 78 (FIGS. 5A and 5B) are constructed in the same manner as the receiver 61 (FIG. 4B) of the terminal 41 or the receiver 64 of the terminal 44 (FIG. 2). The transmitter 74 includes the driver 102 and a light emitting element 120 which is wide in band and direction. The transmitters 80 and 82 (FIGS. 5A and 5B) each include an AND gate 122, a driver 102 and a light emitting element 124 which are relatively narrow in band and direction. The destination determining means 84 includes the transmission forbidding signal generators 86 and 88, the receive completion sensors 90 and 92 and the frequency converter 94.

The transmission forbidding signal generators 86 and 88 each include a flip-flop 130. The flip-flop 130 is set at the rising of a received signal and outputs a transmission forbidding signal (when the signal is "low", the transmission is forbidden) from its $Q/$ (to be read as Q bar) terminal to the AND gate 122 of the transmitter 80 or 82 to forbid the transmission of the signal from the transmitter 80 or 82.

The receive completion sensors 90 and 92 each include an exclusive OR gate 132, a counter 134, an inverter 136 and an OR gate 138. When the signal receive operation by the receiver 76 or 78 is completed, only a "low" signal is output from the demodulator 118 of such receiver. The "low" signal from demodulator 118 is provided as one input to the exclusive OR gate 132. At that time, since the other input to the exclusive OR gate 132 (the Q output of flip-flop 130) is "high", the output of gate 132 will be "high" and hence the counter 134 commences the counting operation. The counter 134, after enduring this state for a predetermined duration of time, outputs a "high" signal when it completes a predetermined number of counts. The "high" signal output (D terminal) from the counter 134 is supplied to a reset input of the flip-flop 130 of the transmission forbidding signal generator 86 via the inverter 136 and the OR gate 138 to reset the flip-flop 130. When the flip-flop 130 is reset, the transmission forbidding signal ($Q/$ output) is stopped ("high") to return the transmitter 80 or 82 to its initial state in which a signal can be transmitted.

The frequency converter 94 (FIG. 5A) consists of an OR gate 140, a counter 142 and an oscillator 144. In case no signal is received from any receiver, inputs of the OR gate 140 are "low" and hence the output thereof is also "low", so that the counter 142 is reset and a counting operation is not performed. Accordingly, a "low" signal is output from D terminal of the counter 142 to the AND gate 122 of each of the transmitters 80 and 82 and to the driver 102 of the transmitter 74 (FIG. 5B). When any one of the receivers 72, 76 or 78 receives a signal from another repeater or terminal, coded signals, shown as the square wave form in FIG. 6(g), are output from the demodulator 118 of receivers 76 and 78 or from demodulator 119 of receiver 72. The signals "high" and "low" thus output from demodulators 118 and 119 are supplied to the reset input of the counter 142 via the OR gate 140. The counter 142 performs the counting operation in accordance with clocks from the oscillator 144 only when the reset input thereof is "high". On the other hand, when the reset signal is "low", no counting operation is performed. Accordingly, when the signal, as shown in FIG. 6(g), is input to the reset input of the counter 142, a modulated signal, as shown in FIG. 6(f) and as an electrical signal at the frequency $f_2$, is output from the output terminal D of the counter 142 and is supplied to the AND gate 122 of each of transmitters 80 and 82.

Next, the operation of the destination determining structure 84 will be described in regard to FIGS. 5A and 5B. When a signal is transmitted from the terminal 44, the receiver 72 of the optical repeater 60 receives the optical signal $f_1$ to send a coded signal to the OR gate 140 in the same manner as a signal received by the receiver 64 of the above mentioned terminal 44. Then, the frequency converter 94 sends the electrical signal from the D terminal thereof at the frequency $f_2$ to the transmitters 74, 80 and 82, as has been described above. The receiver 74, upon receiving the electrical signal at the frequency $f_2$, transmits an optical signal $f_2$ from the light emitting element 120 to the terminal 44, the element 120 being driven by the driver 102.

Next, the case in which one repeater, as 50 (FIG. 2), receives the optical signal $f_2$ sent from another repeater, as 60 (FIG. 3), will be described. It is assumed that the receiver 76 of the repeater 60 receives the optical signal from the other repeater 50. The receiver 76 of the repeater 60, upon receiving the optical signal $f_2$, sends the signal, as shown in the wave form in FIG. 6 (g), to the OR gate 140 and to the transmission forbidding signal generator 86 (FIG. 5A). The frequency converter 94 outputs the electrical signal at the frequency f2 from the output terminal D thereof in accordance with the signal sent to the OR gate 140 and the signal thus output is supplied to the transmitters 74, 80 and 82, as has been described above. The transmitter 74 (FIG. 5B), upon receiving the electrical signal $f_2$, transmits the optical signal $f_2$ to the terminal 44, as has been described above. On the other hand, the transmission forbidding signal generator 86 (FIG. 5A) sends a "low" transmission forbidding signal from its Q/ terminal to the AND gate 122 of the transmitter 80 in accordance with the signal input into the transmission forbidding signal generator 86. Hence, no signal is transmitted from the transmitter 80 of repeater 60 to the repeater 50 from which the signal has been transmitted. In addition, on this occasion, the receiver 78 (FIG. 5B) does not receive an optical signal from the other repeater 70, so that no transmission forbidding signal is output from the transmission forbidding signal generator 88. Accordingly, the transmitter 82 (FIG. 5B) sends an optical signal at the frequency $f_2$ to the next repeater in accordance with the electrical signal at the frequency $f_2$ from the frequency converter 94.

As has been described above, the data communication in optical signal form is performed among the optical repeaters 50, 60 or 70 without temporarily collecting communication data in a communication controller, by which an advantage can be obtained that the entire system can be prevented from being disabled due to the failure of a communication controller. In addition, the system is constructed such that one repeater does not transmit a received signal to another repeater which transmitted the signal, thereby reducing errors in communication.

It is thus seen that herein shown and described is an optical wireless communication system that uses light means transmitted among a plurality of terminals or like units which are spaced or separated from each other. The structure and arrangement of the present invention enable the accomplishment of the objects and advantages mentioned above, and while a preferred embodiment has been disclosed herein, variations thereof may occur to those skilled in the art. It is contemplated that all such variations and modifications not departing from the spirit and scope of the invention hereof are to be construed in accordance with the following claims.

What is claimed is:

1. An optical wireless communication system comprising a plurality of terminals each having a transmitter for transmitting optical signals at a first carrier frequency and a receiver for receiving optical signals at a second carrier frequency, and a plurality of optical repeaters each having a plurality of transmitters, a plurality of receivers and means for determining the path and destination of optical signals, said plurality of optical repeaters being coupled so as to communicate optically with one or more of the terminals through a first optical wireless communication channel and to communicate optically with each of the other optical repeaters through a second optical wireless communication channel wherein each of said optical repeaters converts the carrier frequency of received optical signals from said first frequency to said second frequency to transmit said optical signals converted to said second frequency from said transmitter incorporated in each of said optical repeaters to each of the terminals and to each of the other optical repeaters coupled thereto when each of said optical repeaters receives said optical signals at said receiver of said optical repeater from one of said terminals through said first optical wireless communication channel, and each of said optical repeaters transmits optical signals from said transmitter incorporated in said optical repeater to all the terminals and to all the other optical repeaters coupled thereto except the transmitting optical repeater of the optical signals when said each of the optical repeaters receives said optical signals at the receiver thereof from the other optical repeater coupled to said receiver through said second optical wireless communication channel.

2. The system of claim 1 wherein the transmitter of each terminal includes a modulator for receiving coded data, a light emitting element coupled to the modulator for transmitting optical signals to the optical repeaters, and a driver coupled to the light emitting element for driving thereof.

3. The system of claim 1 wherein the receiver of each terminal includes a light receiving element for receiving an optical signal from an optical repeater, an amplifier coupled to the light receiving element for amplifying the optical signal, a band pass filter coupled to the amplifier and outputting an electrical signal, an automatic gain control circuit coupled to the filter for reducing signal distortion, and a demodulator coupled with the control circuit for coding an output signal.

4. The system of claim 1 wherein each of the optical repeaters includes a receiver for receiving optical signals from at least one terminal and a transmitter for transmitting optical signals to at least one terminal, a receiver for receiving optical signals from at least one other optical repeater and a transmitter for transmitting optical signals to at least one other optical repeater.

5. The system of claim 1 wherein each of the optical repeaters includes optical signal destination determining means for selecting the terminal to receive the optical signal.

6. The system of claim 5 wherein the optical signal destination determining means includes a transmission forbidding signal generator, a receive completion sensor coupled to the signal generator, and a frequency converter coupled to the sensor for outputting signals to be transmitted.

7. An optical repeater for use in an optical wireless communication system that includes a plurality of terminals having means for transmitting and for receiving optical signals, said optical repeater comprising a
    plurality of transmitters for communicating optically with said terminals through one optical wireless communication channel and for communicating optically with other optical repeaters through another optical wireless communication channel,
    plurality of receivers for receiving optical signals from said terminals and from said other optical repeaters, and
    means for determining destination of optical signals wherein said optical repeater converts the frequency of received optical signals from one frequency to another frequency to transmit said converted signals from said transmitter of said optical repeater to said terminals and to other optical repeaters coupled thereto when said optical repeater receives said optical signals at said receiver therein from one terminal through said one optical wireless communication channel and said optical repeater transmits optical signals from said transmitter incorporated therein to said terminals and to all of the other optical repeaters coupled thereto except the transmitting optical repeater of said optical signals when each of the other optical repeaters receives said optical signals from another optical repeater coupled to said receiver through said another optical wireless communication channel.

8. The optical repeater of claim 7 in the system wherein the transmitter of each terminal includes a modulator for receiving coded data, and a light emitting element coupled to the modulator for transmitting optical signals to other optical repeaters, and a driver coupled to the light emitting element for driving thereof.

9. The optical repeater of claim 7 in the system wherein the receiver of each terminal includes a light receiving element for receiving an optical signal from an optical repeater, an amplifier coupled to the light receiving element for amplifying the optical signal, a band pass filter coupled to the amplifier and outputting an electrical signal, an automatic gain control circuit coupled to the filter for reducing signal distortion, and a demodulator coupled with the control circuit for coding an output signal.

10. The optical repeater of claim 7 wherein the optical signal destination determining means selects the terminal to receive the optical signal.

11. The optical repeater of claim 7 wherein the optical signal destination determination means includes a transmission forbidding signal generator, a receive completion sensor coupled to the signal generator, and a frequency converter coupled to the sensor for outputting signals at said another frequency to be transmitted.

* * * * *